UNITED STATES PATENT OFFICE.

JOHN HARTLIEB, OF READING, PENNSYLVANIA.

IMPROVED COMPOSITION FOR PAVEMENTS, &c.

Specification forming part of Letters Patent No. 59,391, dated November 6, 1866.

*To all whom it may concern:*

Be it known that I, JOHN HARTLIEB, of Reading, in the county of Berks and State of Pennsylvania, have invented a new and useful Improvement in Composition for Pavement; and I do hereby declare that the following is a full, clear, and exact description of the same.

This invention relates to a compound which is made of coal-tar, asphaltum, sharp sand, hammer-stroke scales or flakes, turpentine, and common gravel, and which is intended as a pavement for garden-walks, sidewalks of streets, or other similar purposes.

The proportion in which I mix the above-named ingredients together is about as follows: For one square-yard, I take coal-tar, three quarts; asphaltum, one-half pound; sharp sand four quarts; hammer-stroke flakes, three quarts; turpentine, one-half pint; gravel, sixteen quarts.

In order to mix these ingredients properly together, I take asphaltum and turpentine, and put both together into an iron kettle, then boil into a liquid mass, pour in the coal-tar, and stir while boiling. Now, mix up hammer-stroke scales and sand or gravel with this liquid, spread and roll down with an iron or stone roller, a double layer being prepared, the lower one with gravel and the upper with sharp sand. By these means a very solid and durable mass is obtained which is not liable to sustain an injurious effect by the changes of the atmosphere or of the temperature, and which produces a pavement of superior smoothness and durability.

What I claim as new, and desire to secure by Letters Patent, is—

The within-described compound for pavement, made as set forth.

JOHN HARTLIEB.

Witnesses:
   JACOB S. LIVINGOOD,
   M. L. MONTGOMERY.